（12）United States Patent
Nikayin et al.

(10) Patent No.: US 9,822,926 B2
(45) Date of Patent: Nov. 21, 2017

(54) ELECTRICAL BOX MOUNTING BRACKET

(71) Applicants: Saeed Nikayin, Los Angeles, CA (US); Kai Zhang, Los Angeles, CA (US); Gilbert Loera, Los Angeles, CA (US); Andrew Choi, Los Angeles, CA (US)

(72) Inventors: Saeed Nikayin, Los Angeles, CA (US); Kai Zhang, Los Angeles, CA (US); Gilbert Loera, Los Angeles, CA (US); Andrew Choi, Los Angeles, CA (US)

( * ) Notice: Subject to any disclaimer, the term of this patent is extended or adjusted under 35 U.S.C. 154(b) by 0 days.

(21) Appl. No.: 14/712,834

(22) Filed: May 14, 2015

(65) Prior Publication Data
US 2016/0334056 A1 Nov. 17, 2016

(51) Int. Cl.
*H02G 3/12* (2006.01)
*F16M 13/02* (2006.01)

(52) U.S. Cl.
CPC .......... *F16M 13/022* (2013.01); *H02G 3/12* (2013.01); *H02G 3/125* (2013.01); *H02G 3/126* (2013.01)

(58) Field of Classification Search
CPC .... F16M 13/022; F16M 13/027; F16M 13/02; H02G 3/12; H02G 3/125; E04G 21/243; E04B 9/18; E04B 9/006; B60R 2011/0084; A62C 35/68
USPC ......... 248/214, 200.1, 200, 205.1, 201, 300, 248/301, 303–307
See application file for complete search history.

(56) References Cited

U.S. PATENT DOCUMENTS

| | | | |
|---|---|---|---|
| 1,288,024 A | 12/1918 | Kendig | |
| 1,930,928 A | 10/1933 | Dunlap, Sr. | |
| 1,982,957 A | 12/1934 | Knell | |
| 3,182,805 A | 5/1965 | Foster, Jr. et al. | |
| 4,757,967 A | 7/1988 | Delmore | |
| 4,967,990 A | 11/1990 | Rinderer | |
| 5,114,105 A | 5/1992 | Young | |
| 5,209,444 A | 5/1993 | Rinderer | |
| 5,333,137 A | 7/1994 | Fujiyama | |
| 5,516,068 A | 5/1996 | Rice | |
| 5,927,667 A | 7/1999 | Swanson | |
| 6,209,836 B1 | 4/2001 | Swanson | |
| 6,389,658 B1 * | 5/2002 | Pfaller | F16B 2/245 220/3.9 |
| 6,484,979 B1 | 11/2002 | Medlin, Jr. | |
| 6,484,980 B2 | 11/2002 | Medlin, Sr. et al. | |
| 6,761,341 B2 * | 7/2004 | Pfaller | H02G 3/125 248/200.1 |
| 6,768,071 B1 | 7/2004 | Gretz | |
| 7,073,757 B2 | 7/2006 | Johnson et al. | |
| 7,360,745 B2 | 4/2008 | Nikayin et al. | |
| 7,472,875 B2 * | 1/2009 | Rinderer | H02G 3/125 220/3.3 |

(Continued)

Primary Examiner — Nkeisha Smith
(74) Attorney, Agent, or Firm — Kirk A. Buhler; Buhler & Associates

(57) ABSTRACT

Improvements in a bracket is disclosed for mounting an electrical box onto a mounting bar. An electrical box can be preinstalled onto the bracket and clamped onto the mounting bar using wings. Wings on the bracket are biased towards a closed position and can be moved to an open position by squeezing tabs on said wings. A fastener hole on the central body of the bracket allows for installers to preinstall an electrical box onto said bracket. Thus, an installer can secure the bracket and electrical box using a screw and adjust the position of the bracket on the mounting bar.

20 Claims, 4 Drawing Sheets

(56) References Cited

U.S. PATENT DOCUMENTS

| | | | | |
|---|---|---|---|---|
| 8,403,277 B2* | 3/2013 | Nuernberger | .......... | H02G 3/125 174/58 |
| 8,702,047 B2* | 4/2014 | Nuernberger | .......... | H02G 3/125 174/58 |
| 8,770,526 B2* | 7/2014 | Siddiqui | ................ | H02G 3/105 174/58 |
| 9,261,120 B2* | 2/2016 | Colangelo | ................ | F16B 2/22 |
| 2006/0237601 A1* | 10/2006 | Rinderer | ................ | H02G 3/125 248/200.1 |
| 2009/0166486 A1* | 7/2009 | Sugiyama | .............. | B60K 20/02 248/200 |
| 2012/0298816 A1* | 11/2012 | Siddiqui | ................ | H02G 3/125 248/220.21 |
| 2013/0140415 A1* | 6/2013 | Nuernberger | .......... | H02G 3/125 248/214 |

* cited by examiner

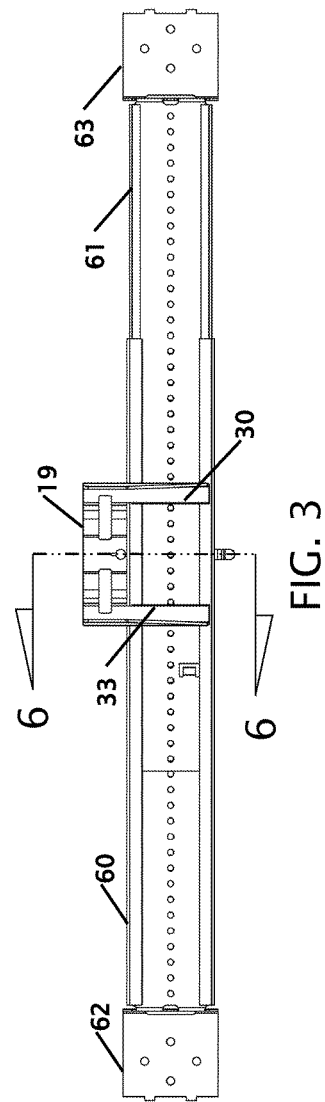
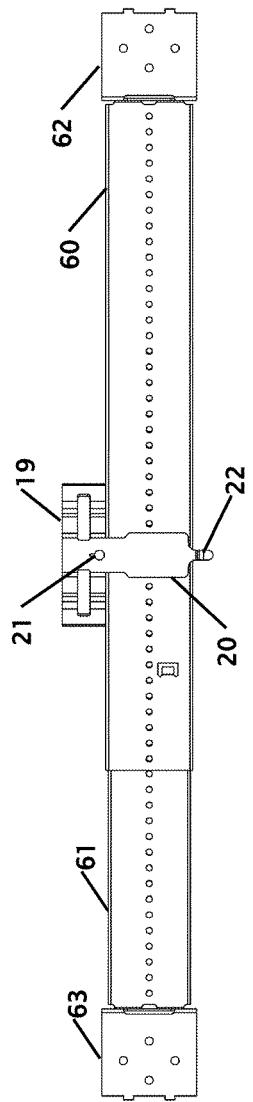
FIG. 3
FIG. 4

ELECTRICAL BOX MOUNTING BRACKET

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an electrical box mounting bracket. More particularly, the present an electrical box mounting bracket connects between an electrical junction box and a rail and allows the electrical junction box to be installed and positioned or re-positioned along the rail without any tools.

Description of Related Art Including Information Disclosed Under 37 CFR 1.97 and 1.98

A number of patents and or publications have been made to address these issues. Exemplary examples of patents and or publication that try to address this/these problem(s) are identified and discussed below.

U.S. Pat. No. 3,182,805 issued May 11, 1965 to A. A. Foster Jr. et al., discloses a Telephone Office Mounting Plate. The mounting plate clamps to a pair of rails to allow the telephone plate to slide along the rails to mount the telephone box at any location along the rails. While this patent allows the telephone box to be mounted to the railing, the telephone box is not a standard junction box that can be moved along the railing system.

U.S. Pat. Nos. 4,967,990 and 5,209,444 issued on Nov. 6, 1990 and May 11, 1993, respectively, both issued to Eric R. Rider disclose a Support for an Electrical box. Both of these patents use a bar that mounts between two studs. The bar has a plurality of holes where a junction box is screwed onto the bar using holes on the bar. While this patent allows for a junction box to be mounted onto various positions on the bar, the positions are finite and further the bar is a fixed length. This patent does not allow for different lengths between studs or for infinite positioning along the bar.

U.S. Pat. No. 5,330,137 issued on Jul. 19, 1994 to John H. Olvia discloses an Apparatus and Methods for Mounting an Electrical Box between Studs in a Wall. This patent uses an open frame where a junction box is mounted with a faceplate through the open frame to an electrical box. The open frame has a fixed dimension between the studs and the connection between the faceplate and the junction box must be made through the frame. Both the faceplate and the junction box must be uniquely fabricated to operate with the frame.

What is needed is an adjustable stud support rail with a bracket that is slidable secured to the bracket. The bracket further should allow for a junction box to the mounted to the bracket. The electrical box mounting bracket disclosed in this document provides the solution.

BRIEF SUMMARY OF THE INVENTION

It is an object of the electrical box mounting bracket to clamp onto a rail or mounting bar and to be able to be adjustably positioned. A mounting bar typically has a channel shaped cross section with a plurality of fastening holes. Flanges on the ends of the mounting bar allow for installation onto wood studs. The electrical box mounting bracket is comprised of at least two wings that are biased towards a closed position. Gripping tabs on the wings clamp onto the open side of a mounting bar. To move the bracket to an open position for mounting onto a mounting bar, an installer can provide a compressive force on tabs of each wing. An installer can thus also adjust the relative position of the bracket with the mounting bar.

It is another object of the electrical box mounting bracket to preinstall an electrical box before installing onto a mounting bar. An electrical junction box is typically a metal enclosure where wiring is brought into the box with conduit. Electrical wires are typically connected to an outlet, switch, or device. In order to place the outlet, switch, or device in its desired location behind drywall, a mounting bar is used to secure the electrical box in place. The electrical box mounting bracket features a fastening hole and tail for securing the electrical box onto said bracket. The assembly of the electrical box and bracket can then be mounted onto the mounting bar in the desired position before permanently securing with screws.

It is still another object of the electrical box mounting bracket to be economical. A bracket that uses open and closed positions can be seen in U.S. Pat. No. 8,702,047. However, due to the orientation of the front and rear jaw, a larger piece of sheet metal is required. The electrical box mounting bracket uses wings that can be moved to an open or closed position oriented in the direction of the mounting bar. As a result, the electrical box mounting bracket is reduced in size while maintaining a secure and dependable installation. This reduces the cost and greatly increases the ease of storage.

Various objects, features, aspects, and advantages of the present invention will become more apparent from the following detailed description of preferred embodiments of the invention, along with the accompanying drawings in which like numerals represent like components.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 shows a rear view of the electrical box mounting bracket mounted onto the expandable rail.

FIG. 4 shows a front view of the electrical box mounting bracket mounted onto the expandable rail.

DETAILED DESCRIPTION OF THE INVENTION

Figure 1:
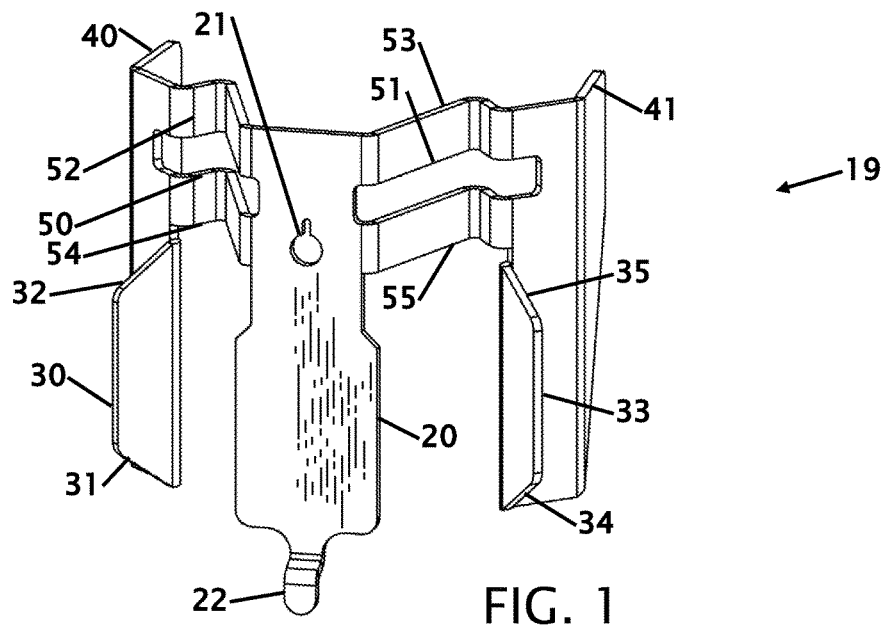
FIG. 1 shows an electrical box mounting bracket.

FIG. 1 shows an electrical box mounting bracket 19. The electrical box mounting bracket 19 is a single piece of punched and formed metal that is bendable to secure the electrical box mounting bracket 19 to a rail and can further be squeezed or bent to move or reposition the electrical box mounting bracket 19 on the rail. An electrical junction box is secured to the electrical box mounting bracket 19 by placing the tab 22 through a first hole in a junction box and then securing a screw through hole 21 and then into the electrical junction box. This secures the junction box onto the flat surface 20 of the electrical box mounting bracket 19.

The electrical box mounting bracket 19 has two wings 30 and 33, with each wing having angled surfaces 31, 32 and 34, 35 respectively. These angled surface 31, 32 and 34, 35 grip into a rail to prevent movement of the electrical box mounting bracket 19 along the rail. The wings 30 and 33 are located on flexing arms 52, 54 and 53, 55. The flexing arms are located outside of interior openings 50 and 51 respectively. The interior openings 50 and 51 allow for both reduced force to flex the electrical box mounting bracket 19 and also maintains a parallel relationship between the flat surface 20 and the two wings 30 and 33.

On the outer sides of the flexing arms 52, 54 and 53, 55, are squeeze tabs 40 and 41. The squeeze tabs 40 and 41 allow an installer to squeeze the tabs 40 and 41 together. When the tabs 40 and 41 are squeezed together, the wings 30 and 33 and pulled away from the flat surface 20 to therefore release the grip of the angled surfaces 31, 32 and 34, 35 on a back rail. When the tabs 40 and 41 are released, the flexing arms 52, 54 and 53, 55 essentially clamp the flat surface onto a rail. This is shown in more detail in the next figure herein.

Figure 2:
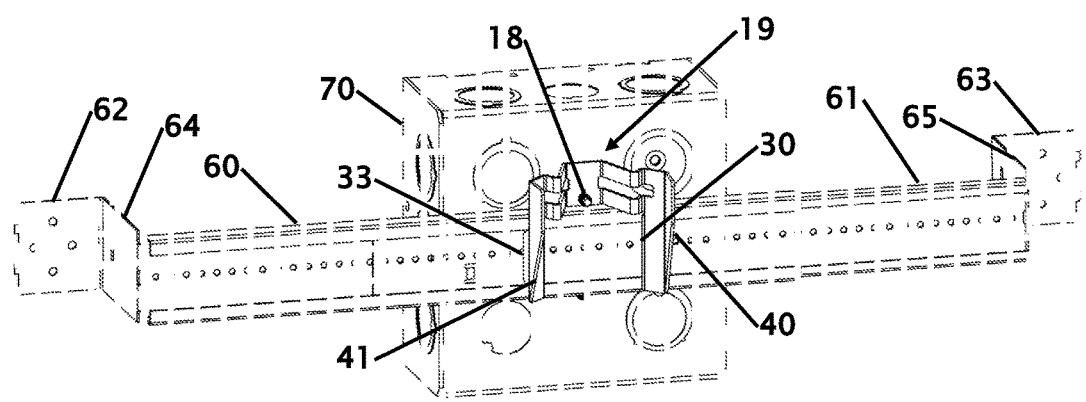
FIG. 2 shows the electrical box mounting bracket mounted onto an expandable rail.

FIG. 2 shows the electrical box mounting bracket 19 mounted onto an expandable rail. The expandable rail is essentially fabricated from two telescoping components 60 and 61. This allows the expandable rail to be adjusted to fit between wall (or ceiling or floor) studs placed at variable distances. The two telescoping components 60 and 61 have mounting ends 62 and 63 that are set-back with jogs 64 and 65 on the telescoping components, respectively. The jogs 64 and 65 allow for a standard junction box 70 to be mounted to the electrical box mounting bracket 19 and then the two telescoping components 60 and 61 at the dimension that essentially makes the front of the junction box 70 flush with a surface of drywall, sheet rock or similar material. The junction box 70 is shown with a single securing fastener 18.

In this figure, the electrical box mounting bracket 19 is shown with two wings 30 and 33 gripping the electrical box mounting bracket 19 onto the telescoping components 60 and or 61. The electrical box mounting bracket 19 is loosened or release from the telescoping components 60 and 61 by squeezing the tabs 40 and 41. Because the two wings of the electrical box mounting bracket 19 are only supported from one side, the electrical box mounting bracket 19 can be completely removed and installed from the telescoping components 60 and 61 when the back rail is installed on studs. This gives an installer the ability to change the junction box as well as the ability to install multiple junction boxes onto the telescoping member 60 and 61.

FIG. 3 shows a rear view of the electrical box mounting bracket 19 mounted onto the expandable rail and FIG. 4 shows a front view of the electrical box mounting bracket 19 mounted onto the expandable rail. In these figures, the electrical junction box has been removed for clarity. These figures show the electrical box mounting bracket 19 as it wraps the wings 30 and 33 around one side of the telescoping back rail(s) 60 and 61 and uses the surface 20 of the front tab as a securing mechanism.

The telescoping back rails 60 and 61 are shown with the side securing plates 62 and 63 respectively. A plurality of holes on the securing plates 62 and 63 allows the telescoping rail to be secured. While the telescoping rail pieces show a number of holes along the length of the telescoping surfaces, they do not serve a purpose to secure the telescoping members or the electrical box mounting bracket 19. The junction box mounting hole 21 and the mounting tab 22 are shown in these figures.

Figure 5:
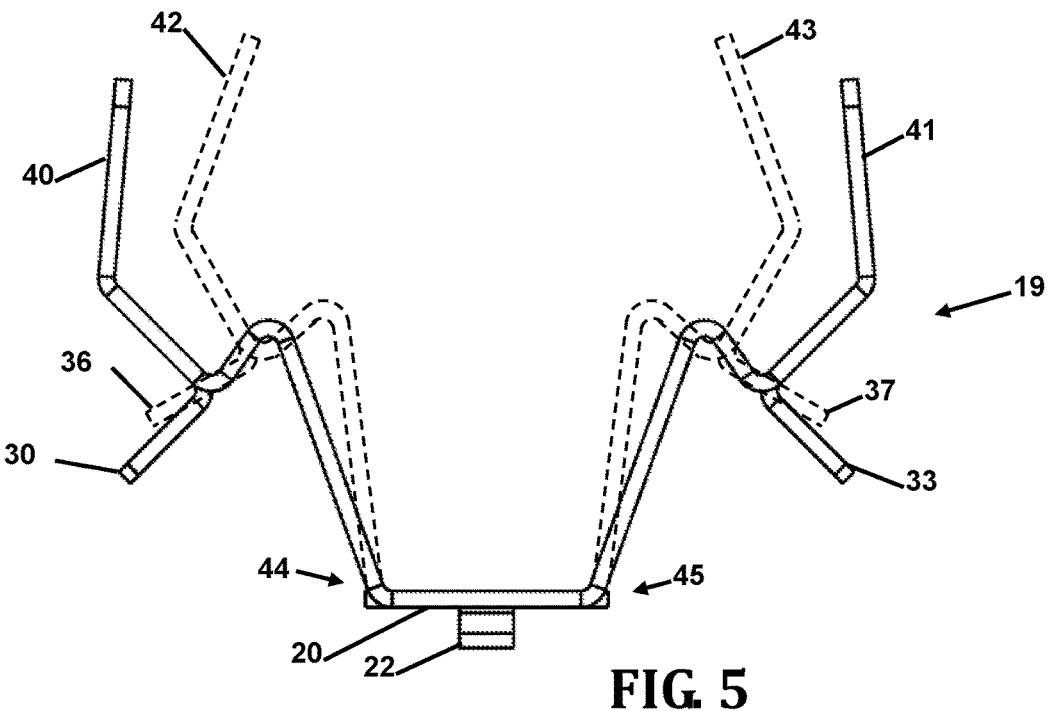
FIG. 5 shows the electrical box mounting bracket in an open and in a "squeezed" embodiment.

FIG. 5 shows the electrical box mounting bracket 19 in an open and in a "squeezed" embodiment. This figure shows how the geometry of the electrical box mounting bracket 19 distorts from a relaxed, normal or nominal condition to a condition that allows the electrical box mounting bracket 19 to be installed onto the rail. At the bottom of this figure, the mounting tab 22 is visible on the flat mounting surface 20 where an electrical junction box would be mounted. The outer tabs 40 and 41 are squeezed, or brought closer together 42, 43 where they flex through bending axis 44 and 45. As the tabs 40 and 41 are articulated, the movement of the wings 30 and 33 are also shown to move to positions 36 and 37 respectively. When the outer tabs 40 and 41 are released, the electrical box mounting bracket 19 will return to the normal position, or the position where the rail is secured between the face 20 and the wings 30 and 33 as shown in the following figure.

Figure 6:
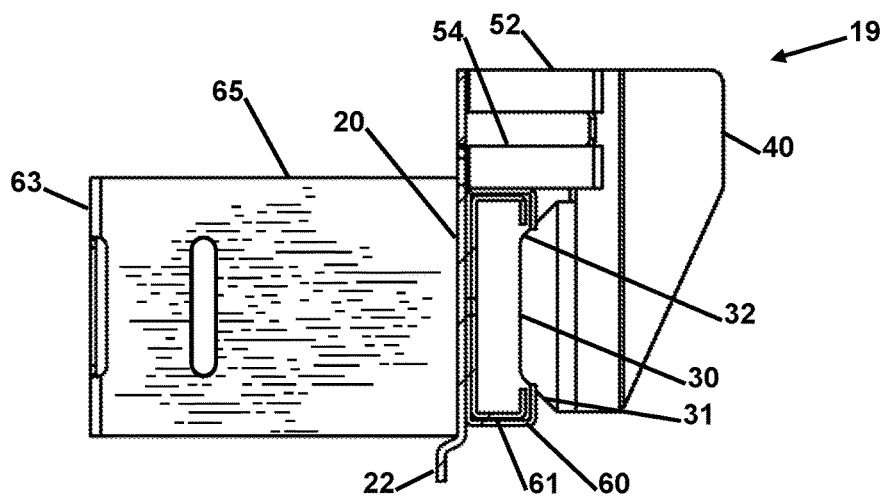
FIG. 6 shows a cross-sectional view of a mounted electrical box mounting bracket cut through section 6-6 from FIG. 3.

FIG. 6 shows a cross-sectional view of a mounted electrical box mounting bracket 19 cut through section 6-6 from FIG. 3. This figure also shows the jog 65 of one of the adjustable rails 61. The electrical junction box has been removed from this figure for clarity. A mounting hole in the side of the rail can be used to provide further support to the telescoping rail(s). The telescoping portions of the telescoping rails 60 and 61 can be seen in this sectional view.

The rear of the telescoping rail 60 has a recessed rear slot. The front flat surface 20 of the electrical box mounting bracket 19 is shown being held against the telescoping rail 60. This is being held in place with wing 30 by angled sides 31 and 32. This essentially creates a three point clamp to prevent movement of the electrical box mounting bracket 19 along the rail 60. Two of the flexing arm 52 and 54 are shown. These arm provide the clamping force that retains the electrical box mounting bracket 19 on the telescoping rail 60. Squeezing tab 40 will alter the position of the wing 30.

The tab 22 is fitted into a mounting hole in an electrical junction box to provide one securing location for the junction box (not shown) while a second securing location is a screw (not shown in this figure).

Figure 7:
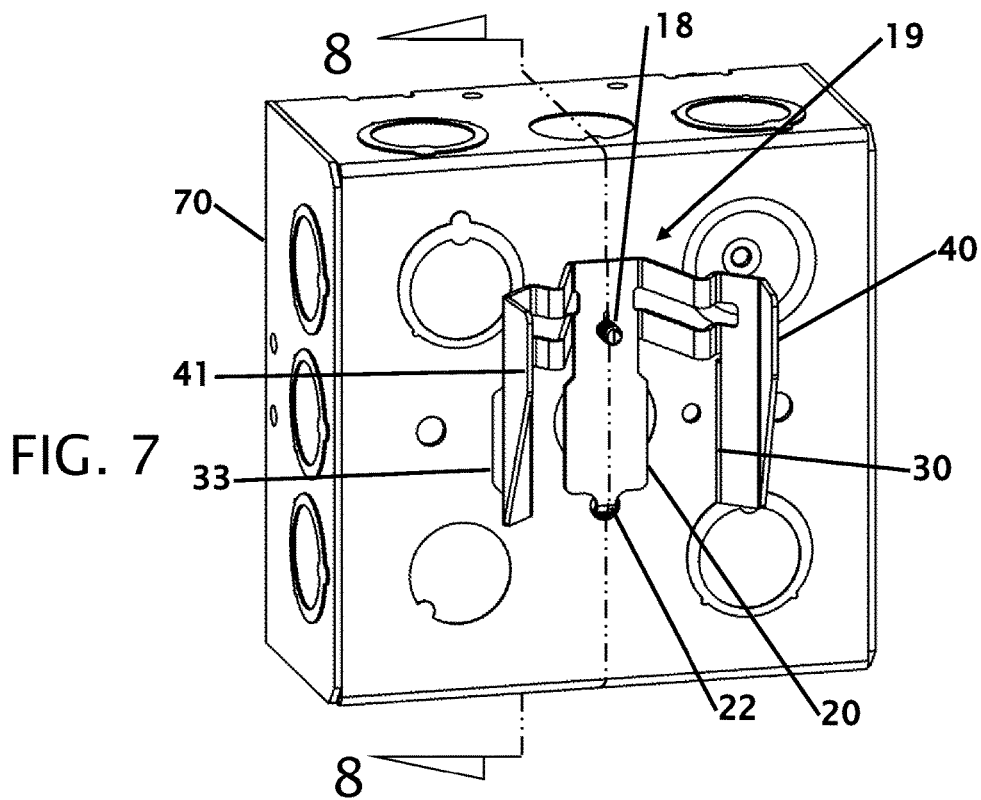
FIG. 7 shows a rear perspective view of the electrical box mounting bracket mounted onto an electrical junction box.
Figure 8:
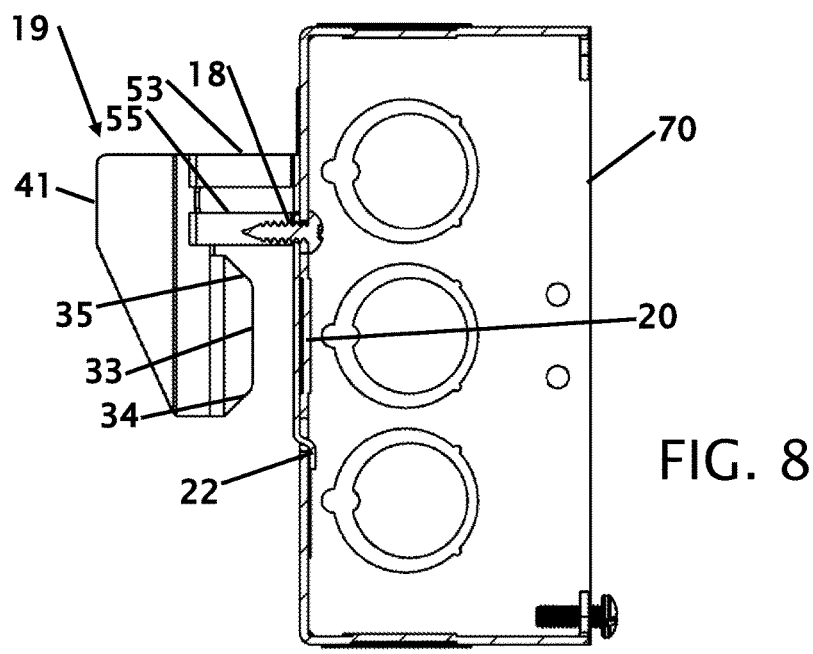
FIG. 8 shows a cross-sectional view of a mounted electrical box mounting bracket cut through section 8-8 from FIG. 7

FIG. 7 shows a rear perspective view of the electrical box mounting bracket 19 mounted onto an electrical junction box and FIG. 8 shows a cross-sectional view of a mounted electrical box mounting bracket 19 cut through section 8-8 from FIG. 7. In these figures, the telescoping expandable rail has been removed for clarity. From FIG. 8, the junction box 70 is shown with the tab 22 in one hole and fastener 18 in a second hole in the junction box 70. The junction box 70 is essentially flush with the flat portion of tab 20. While two securing holes are being used, more than two locations are contemplated. While the double junction box is shown, a single, triple or greater junction box is contemplated.

In FIG. 8, the squeeze tab 41 is shown in the back of the electrical box mounting bracket 19 with the bends 53, 55 that connect to the wing 33. Angled pinch surfaces 34 and 35 are shown in FIG. 8. These surfaces provide the clamping force to retain the electrical box mounting bracket 19 on the back rail (not shown in this figure).

Thus, specific embodiments of an electrical box mounting bracket have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. An electrical mounting bracket comprising:
a bracket having a central surface to contact with a back side of an electrical box;
said central surface having a fastening hole and a tail for mounting said electrical box to said bracket and further creating a vertical central axis between said fastening hole and said tail;
at least two wings extending from said central surface;
each of said wings having a gripping tab contact surface and a squeezing tab surface wherein said squeezing tab surface is distal from said gripping tab surface;
said at least two wings each having at least two flexing arm spring members that flex on opposites sides of said central surface and perpendicular to said vertical central axis;
said flexing arms spring members independently flex though bending axis parallel with said vertical central axis between an open and a closed position and being biased towards said closed position, and
said gripping tabs are configured to contact a mounting bar and said squeezing tabs move said gripping tabs to an open position.

2. The electrical mounting bracket according to claim 1 wherein each of said at least two separate spring members is two spaced strips with an interior opening between each.

3. The electrical mounting bracket according to claim 1 wherein said mounting bracket is formed from metal.

4. The electrical mounting bracket according to claim 1 further includes a mounting bar.

5. The electrical mounting bracket according to claim 4 wherein said mounting bar is adjustable for length.

6. The electrical mounting bracket according to claim 4 wherein said mounting bar has flanges at both ends of said mounting bar.

7. The electrical mounting bracket according to claim 6 wherein said flanges are offset from said mounting bar.

8. The electrical mounting bracket according to claim 7 wherein said offset approximates a depth of said electrical box.

9. The electrical mounting bracket according to claim 4 wherein said electrical mounting bracket is temporally securable onto said mounting bar.

10. The electrical mounting bracket according to claim 9 wherein said electrical mounting bracket is movable along said mounting bar.

11. The electrical mounting bracket according to claim 9 wherein said at least two wings of said electrical mounting bracket grip said mounting bar.

12. The electrical mounting bracket according to claim 4 wherein said mounting bar has a recessed rear slot.

13. The electrical mounting bracket according to claim 12 wherein said gripping tabs are engaged into said recessed rear slot.

14. The electrical mounting bracket according to claim 13 wherein opposing ends of said gripping tabs engage into opposing surfaces of said recessed rear slot.

15. The electrical mounting bracket according to claim 14 wherein said electrical mounting bracket grips said mounting bar as a three-point clamp.

16. The electrical mounting bracket according to claim 4 wherein said mounting bar is formed as to telescoping members.

17. The electrical mounting bracket according to claim 4 wherein said mounting bar is electrically conductive to said electrical box through said electrical mounting bracket.

18. The electrical mounting bracket according to claim 1 wherein said electrical box mounts to said electrical mounting bracket with a single removable fastener.

19. The electrical mounting bracket according to claim 1 wherein both of said at least two wings have said flexing arm spring members that clamp said electrical mounting bracket to said mounting bar.

20. The electrical mounting bracket according to claim 1 wherein said gripping tabs operate said two flexing arm spring members and are connected to each of said gripping tabs independently on opposing sides of said vertical central axis.

* * * * *